US008572389B2

(12) United States Patent
Little

(10) Patent No.: US 8,572,389 B2
(45) Date of Patent: Oct. 29, 2013

(54) SYSTEM AND METHOD FOR PROTECTING MASTER ENCRYPTION KEYS

(75) Inventor: Herbert A. Little, Waterloo (CA)

(73) Assignee: Blackberry Limited, Waterloo, Ontario (CA)

(*) Notice: Subject to any disclaimer, the term of this patent is extended or adjusted under 35 U.S.C. 154(b) by 1720 days.

(21) Appl. No.: 11/313,657

(22) Filed: Dec. 22, 2005

(65) Prior Publication Data
US 2007/0165844 A1 Jul. 19, 2007

Related U.S. Application Data

(60) Provisional application No. 60/726,271, filed on Oct. 14, 2005.

(51) Int. Cl.
H04L 9/32 (2006.01)
H04L 29/06 (2006.01)
H04L 9/00 (2006.01)
H04L 9/08 (2006.01)

(52) U.S. Cl.
USPC ........... 713/179; 713/150; 713/155; 713/156; 713/165; 713/166; 713/168; 713/170; 713/192; 713/193; 380/30; 380/277; 380/281; 380/284; 726/3; 726/5; 726/26; 726/27

(58) Field of Classification Search
USPC ......... 713/150, 179, 155, 156, 165, 166, 170, 713/168, 192, 193; 380/30, 270–284; 726/3, 5, 26, 27
See application file for complete search history.

(56) References Cited

U.S. PATENT DOCUMENTS 4,028,500 A 6/1977 McClure et al.
5,410,602 A 4/1995 Finkelstein et al.
5,457,748 A 10/1995 Bergum et al.
5,623,546 A 4/1997 Hardy et al.
5,666,530 A 9/1997 Clark et al.
(Continued)

FOREIGN PATENT DOCUMENTS

CA 2476914 2/2006
EP 0 500 245 8/1992
(Continued)

OTHER PUBLICATIONS

European Supplementary Search Report. Application No. 05826460. 7. Dated: Feb. 14, 2008.
(Continued)

Primary Examiner — Edan Orgad
Assistant Examiner — Kari Schmidt
(74) Attorney, Agent, or Firm — Bereskin & Parr LLP/S.E.N.C.R.L.,s.r.l.

(57) ABSTRACT

A system and method for protecting master transport encryption keys stored on a computing device. Master transport encryption keys are used to secure data communications between computing devices. In one example embodiment, there is provided a method in which a copy of a master transport encryption key is generated and stored in a volatile store of a first computing device (e.g. a mobile device). This copy of the master transport encryption key can be used to facilitate the decryption of data received at the first computing device from a second computing device (e.g. a data server), even while the first computing device is locked. The method also comprises encrypting the master transport encryption key, with a content protection key for example, and storing the encrypted master transport encryption key in a non-volatile store of the first computing device.

18 Claims, 5 Drawing Sheets

(56) References Cited

U.S. PATENT DOCUMENTS

| | | | |
|---|---|---|---|
| 5,710,922 A | 1/1998 | Alley et al. | |
| 5,727,202 A | 3/1998 | Kucala | |
| 5,778,068 A | 7/1998 | Johnson et al. | |
| 5,778,346 A | 7/1998 | Frid-Nielsen et al. | |
| 5,812,671 A | 9/1998 | Ross | |
| 5,870,030 A | 2/1999 | DeLuca et al. | |
| 5,956,707 A | 9/1999 | Chu | |
| 5,991,399 A | 11/1999 | Graunke et al. | |
| 6,000,000 A | 12/1999 | Hawkins et al. | |
| 6,061,448 A | 5/2000 | Smith et al. | |
| 6,073,237 A | 6/2000 | Ellison | |
| 6,081,601 A | 6/2000 | Raivisto | |
| 6,084,969 A | 7/2000 | Wright et al. | |
| 6,085,323 A * | 7/2000 | Shimizu et al. | 713/150 |
| 6,119,228 A | 9/2000 | Angelo et al. | |
| 6,125,369 A | 9/2000 | Wu et al. | |
| 6,209,098 B1 | 3/2001 | Davis | |
| 6,219,694 B1 | 4/2001 | Lazaridis et al. | |
| 6,229,894 B1 | 5/2001 | Van Oorschot et al. | |
| 6,230,186 B1 | 5/2001 | Yaker | |
| 6,266,420 B1 | 7/2001 | Langford et al. | |
| 6,266,775 B1 | 7/2001 | Kamba | |
| 6,289,105 B1 | 9/2001 | Murota | |
| 6,301,658 B1 | 10/2001 | Koehler | |
| 6,313,732 B1 | 11/2001 | DeLuca et al. | |
| 6,348,972 B1 | 2/2002 | Taniguchi et al. | |
| 6,389,455 B1 | 5/2002 | Fuisz | |
| 6,531,985 B1 | 3/2003 | Jones et al. | |
| 6,564,320 B1 | 5/2003 | De Silva et al. | |
| 6,661,927 B1 | 12/2003 | Suarez et al. | |
| 6,697,942 B1 | 2/2004 | L'Heureux et al. | |
| 6,779,115 B1 | 8/2004 | Naim | |
| 6,819,766 B1 | 11/2004 | Weidong | |
| 6,829,357 B1 | 12/2004 | Alrabady et al. | |
| 6,904,521 B1 | 6/2005 | Jivsov | |
| 6,918,038 B1 | 7/2005 | Smith et al. | |
| 6,925,568 B1 | 8/2005 | Heinonen | |
| 6,931,532 B1 | 8/2005 | Davis et al. | |
| 6,983,367 B2 * | 1/2006 | Go et al. | 713/168 |
| 6,993,137 B2 | 1/2006 | Franksdonk | |
| 7,003,667 B1 | 2/2006 | Slick et al. | |
| 7,020,708 B2 | 3/2006 | Nelson et al. | |
| 7,113,927 B1 | 9/2006 | Tanaka et al. | |
| 7,127,604 B2 | 10/2006 | Lide et al. | |
| 7,171,552 B1 * | 1/2007 | Bell | 713/150 |
| 7,228,418 B1 | 6/2007 | Girault | |
| 7,254,712 B2 | 8/2007 | Godfrey et al. | |
| 7,299,502 B2 | 11/2007 | Schmeling et al. | |
| 7,529,374 B2 * | 5/2009 | Huttunen | 380/277 |
| 7,543,160 B2 * | 6/2009 | Adams et al. | 713/193 |
| 7,546,453 B2 | 6/2009 | Little et al. | |
| 7,653,815 B2 | 1/2010 | Godfrey et al. | |
| 7,827,406 B2 | 11/2010 | Brown et al. | |
| 2001/0046307 A1 | 11/2001 | Wong | |
| 2001/0050990 A1 | 12/2001 | Sudia | |
| 2002/0007453 A1 | 1/2002 | Nemovicher | |
| 2002/0032861 A1 | 3/2002 | Azuma | |
| 2002/0035685 A1 | 3/2002 | Ono et al. | |
| 2002/0035687 A1 | 3/2002 | Skantze | |
| 2002/0051544 A1 | 5/2002 | Kikuchi et al. | |
| 2002/0053032 A1 | 5/2002 | Dowling et al. | |
| 2002/0059383 A1 | 5/2002 | Katsuda | |
| 2002/0147905 A1 | 10/2002 | Perlman | |
| 2002/0169954 A1 | 11/2002 | Bandini et al. | |
| 2002/0176067 A1 | 11/2002 | Charbon | |
| 2003/0002671 A1 | 1/2003 | Inchalik et al. | |
| 2003/0074555 A1 | 4/2003 | Fahn et al. | |
| 2003/0097596 A1 * | 5/2003 | Muratov et al. | 713/202 |
| 2003/0126085 A1 | 7/2003 | Srinivasan | |
| 2003/0172122 A1 | 9/2003 | Little et al. | |
| 2003/0198350 A1 | 10/2003 | Foster et al. | |
| 2003/0212888 A1 | 11/2003 | Wildish et al. | |
| 2004/0005912 A1 * | 1/2004 | Hubbe et al. | 455/558 |
| 2004/0083364 A1 | 4/2004 | Andreaux et al. | |
| 2004/0093493 A1 | 5/2004 | Bisbee et al. | |
| 2004/0117651 A1 * | 6/2004 | Little et al. | 713/200 |
| 2004/0133520 A1 | 7/2004 | Callas et al. | |
| 2004/0133775 A1 | 7/2004 | Callas et al. | |
| 2004/0196978 A1 | 10/2004 | Godfrey et al. | |
| 2004/0202327 A1 | 10/2004 | Little et al. | |
| 2004/0205248 A1 | 10/2004 | Little et al. | |
| 2004/0266395 A1 * | 12/2004 | Pailles et al. | 455/411 |
| 2005/0005097 A1 | 1/2005 | Murakawa | |
| 2005/0039100 A1 | 2/2005 | Bade et al. | |
| 2005/0114671 A1 | 5/2005 | Little et al. | |
| 2005/0138356 A1 * | 6/2005 | Hurwitz | 713/155 |
| 2005/0148323 A1 | 7/2005 | Little et al. | |
| 2005/0149442 A1 | 7/2005 | Adams et al. | |
| 2005/0163320 A1 * | 7/2005 | Brown et al. | 380/270 |
| 2005/0188219 A1 | 8/2005 | Annicet et al. | |
| 2005/0203855 A1 | 9/2005 | Malcolm | |
| 2005/0210289 A1 | 9/2005 | Brown | |
| 2005/0222991 A1 | 10/2005 | Ikenoya | |
| 2005/0246763 A1 * | 11/2005 | Corcoran et al. | 726/3 |
| 2006/0015722 A1 | 1/2006 | Rowan et al. | |
| 2006/0036848 A1 | 2/2006 | Brown et al. | |
| 2006/0036849 A1 | 2/2006 | Brown et al. | |
| 2006/0036865 A1 | 2/2006 | Brown et al. | |
| 2006/0059332 A1 | 3/2006 | Adams et al. | |
| 2006/0224882 A1 * | 10/2006 | Chin | 713/150 |
| 2007/0083749 A1 | 4/2007 | Fang | |
| 2007/0118874 A1 | 5/2007 | Adams et al. | |
| 2007/0123307 A1 | 5/2007 | Adams et al. | |
| 2007/0165844 A1 | 7/2007 | Little et al. | |
| 2008/0016359 A1 | 1/2008 | Godfrey et al. | |

FOREIGN PATENT DOCUMENTS

| | | |
|---|---|---|
| EP | 0500222 | 8/1992 |
| EP | 0841770 | 5/1998 |
| EP | 0942568 | 9/1999 |
| EP | 1096725 | 5/2001 |
| EP | 1096727 | 5/2001 |
| EP | 1580953 | 9/2005 |
| EP | 1806683 | 7/2007 |
| EP | 1803249 | 4/2010 |
| GB | 2328125 | 2/1999 |
| JP | 10-22992 | 1/1989 |
| JP | 06-276221 | 9/1994 |
| JP | 07-162407 | 6/1995 |
| JP | 7-509333 | 10/1995 |
| JP | 8-251221 | 9/1996 |
| JP | 09-046330 | 2/1997 |
| JP | 10-107832 | 4/1998 |
| JP | 2000-10477 | 6/1998 |
| JP | 11-272581 | 10/1999 |
| JP | 11-272582 | 10/1999 |
| JP | 2001-103571 | 4/2001 |
| JP | 2001-197055 | 7/2001 |
| JP | 2002-535884 | 10/2002 |
| JP | 2004-048139 | 2/2004 |
| KR | 1020030059303 | 7/2003 |
| KR | 10-0902627 | 6/2009 |
| WO | 94/12938 | 6/1994 |
| WO | 96/36934 | 11/1996 |
| WO | 97/41661 | 11/1997 |
| WO | 9741661 | 11/1997 |
| WO | 9834374 | 8/1998 |
| WO | 9905814 | 2/1999 |
| WO | 9906900 | 2/1999 |
| WO | 99/27678 | 3/1999 |
| WO | 99/27678 | 6/1999 |
| WO | 99/63709 | 12/1999 |
| WO | 00/31931 | 6/2000 |
| WO | 00/72506 | 11/2000 |
| WO | 0069114 | 11/2000 |
| WO | 01/01644 | 1/2001 |
| WO | 0116933 | 3/2001 |
| WO | 0124434 | 4/2001 |
| WO | 01/41353 | 6/2001 |
| WO | 01/63386 | 8/2001 |
| WO | 01/71608 | 9/2001 |
| WO | 01/78491 | 10/2001 |
| WO | 02/101580 | 12/2002 |

(56) References Cited

FOREIGN PATENT DOCUMENTS

| WO | 03/009561 | 1/2003 |
|----|-----------|--------|
| WO | 03005636  | 1/2003 |
| WO | 03/079627 | 9/2003 |
| WO | 03/079628 | 9/2003 |

OTHER PUBLICATIONS

European Examination Report. Application No. 05826460.7. Dated: Apr. 4, 2008.
PCT International Search Report and Written Opinion of the International Searching Authority. International Application No. PCT/CA2005/001956. Date: Jul. 29, 2006.
Blom et at. "Conversational IP Multimedia Security", 4$^{th}$ International Workshop on Mobile and Wireless Communications Network, Sep. 9-11, 2002, pp. 147-151.
Fumy et al. "Principles of Key Management", IEEE Journal on Selected Areas in Communications, vol. 11, No. 5, Jun. 1999, pp. 785-793.
Eskicioglu et al. "A Key Transport Protocol Based on Secret Sharing Applications to Information Security", IEEE Transactions on Consumer Electronics, vol. 48, No. 4, Nov. 2002, pp. 816-824.
Kotzanikoloau et al. "Hybrid Key Establishment for Multiphase Self-Organized Sensor Networks", 6$^{th}$ IEEE International Symposium on a World of Wireless Mobile and Multimedia Networks, Jun. 13-16, 2005, pp. 581-587.
Korean Examination Report (English translation). Application No. 10-2007-7011342. Dated: Jul. 15, 2008.
Research in Motion Limited, Blackberry Security White Paper Release 4.0. 2005 Internet Address: http://blackberry.com/knowledgecenterpublic/livelink.exe?func=ll&objId=828044&objAction=browse&sort=name.
Policht, Martin, SQL Server 2005 Security—Part 3 Encryption, Database Journal Internet Address: http://www.databasejournal.com/features/mssql/article.php/3483931.
Encrypt Pre-shared Keys in Cisco IOS Router Configuration Example, Document ID 46420 Cisco Systems, Internet Address: http://www.cisco.com/en/US/tech/tk583/tk372/technologies_configuration_example09186a00801f2336.shtml.
Kiely, Don, SQL Server 2005 Secures Your Data Like Never Before, Sep. 29, 2005. Internet Address: http://www.devx.com/codemag/Article/29351?trk=DXESS_DB.
European Examination Report dated Apr. 20, 2009, European Patent Application No. 05826460.7.
Co-pending U.S. Appl. No. 11/089,869, "System and Method for Processing Encoded Messages for Exchange with a Mobile Data Communication Device", filed Jul. 28, 2005.
Stallings, W.: "S/MIME: E-mail Gets Secure". Byte, McGraw-Hili Inc., St. Peterborough, US, vol. 23, No. 7, Jul. 1998, pp. 41-42, XP000774260.
Crocker S. et al.: "MIME Object Security Services; rfc1848.text". IETF Standard, Internet Engineering Task Force, IETF, CH, Oct. 1995, XP015007633.
Katsuro Inaya, et al., "Use Windows CE Now", ASCII, Oct. 1, 1999, vol. 23, No. 10, pp. 266-285.
Hiroyuki Sawano, Create a Secure Electronic Mail Environment with S/MIME!, @IT Security & Trust, May 30, 2001, URL: http://www.atmarkit.co.jp/fsecurity/special/04smime/smime01.html.
Chinese First Office Action (English translation). Application No. 200580039452.X. Dated: Jul. 3, 2009.
Korean Notice of Decision for Patent (English translation). Application No. 10-2007-7011342. Dated: Apr. 15, 2009.
Reply to Office Action. Co-pending U.S. Appl. No. 11/089,869. Dated: Jun. 4, 2009.
Office Action. Co-pending U.S. Appl. No. 11/089,869. Dated: Feb. 3, 2009.
Lai, M.K.E., et al.: "A Mobile Subscriber Proxy Preserving Writer-to-Reader Message Security," Military Communications Conference, 1996, Milcolm '96, Conference Proceedings, IEEE McLean, VA, USA, Oct. 21-24, 1996, New York, NY, USA, IEEE, US, pp. 461-467, XP010203896.
Cole, R., et al.: "An Architecture for a Mobile OSI Mail Access System," IEEE Journal on Selected Areas in Communications, IEEE Inc., New York, US, vol. 7, No. 2, Feb. 1989, pp. 249-256, XP000904914.
Harris, A.: "Content Privacy and Content Security Working Together," Internet Article, Content Technologies White Paper, 'Online! Sep. 1999, pp. 8-9, XP002223158.
Torvinen, V.: "Wireless PKI: Fundamentals," Internet Article, Radicchio White Paper, 'Online! 2000, pp. 12-13, XP002223159.
Mambo, M., et al.: "Proxy Signatures: Delegation of the Power to Sign Messages," IEICE Transactions on Fundamentals of Electronics, Communications and Computer Sciences, IEICE Tokyo, JP, vol. E79-A, No. 9, Sep. 1, 1996, pp. 1338-1353, XP000679624.
Brown, M., et al.: "PGP in Constrained Wireless Devices," Proceedings of the 9th Usenix Security Symposium, Denver, CO, Aug. 14-17, 2000, XP002210575.
Brown, I., et al.: "A Proxy Approach to E-Mail Security," Software Practice & Experience, John Wiley & Sons Ltd., Chichester, GB, vol. 29, No. 12, Oct. 1999, pp. 1049-1060, XP000852351.
Sybramanyam, V., et al.: "Security in mobile systems," Reliable Distributed Systems, 1998 Proceedings, 17th IEEE Symposium on W. Lafayette, IN, USA, Oct. 20-23, 1998, Los Alamitos, CA, USA, IEEE Comput. Soc., US, pp. 407-412, XP010319125.
International Search Report of Application No. PCT/CA02/00890, date of mailing Dec. 23, 2002, 12 pgs.
Gong et al., Multicast Security and its Extension to a Mobile Environment, SRI International, Computer Science Laboratory, 1995, p. 285.
Syverson, "Limitations on Design Principles for Public Key Protocols", Security and Privacy, 1996, Proceedings, 1996 IEEE Symposium on Oakland, CA, USA, May 6-8, 1996, Los Alamitos, CA, USA, IEEE Comput. Soc., US, pp. 62-72, XP010164926.
Dusse et al., "S/MIME Version 2 Certificate Handling", Database IETF RFC Online IETF, RFC 2312, Mar. 1998, pp. 1-20 (Chapter 2.1, Chapter 4.1), XP002220385.
Hoffman, "Enhanced Services for S/MIME", Database IETF RFC online IETF, RFC 2634, Jun. 1999, pp. 1-58 (Chapter 3, pp. 24-32), XP002220386.
Schumacher, "AutoPGP FAQ, Version 1", Internet Newsgroup, 'Online!(Apr. 19, 1994), XP002230742.
Levien, "Protecting Internet E-Mail from Prying Eyes", Data Communications, McGraw Hill, New York, US, vol. 25, No. 6 (May 1, 1996), pp. 117-118, 120, 122), XP000587586.
Dusse et al., "S/MIME Version 2 Message Specification", Mar. 1998, pp. 1-37.
Amendment. Co-pending U.S. Appl. No. 11/089,869. Dated: Dec. 24, 2009.
United States Office Action. Co-pending U.S. Appl. No. 11/089,869. Dated: Sep. 18, 2009.
European Communication Under Rule 71(3) EPC. Application No. 05826460.7. Dated: Sep. 10, 2009.
Berson T et al.: "Cryptography as a network service" 8th Annual Symposium on Network and Distributed System Security. (NDSS'01) Internet Soc Reston, VA, USA, Feb. 7, 2001-Feb. 9, 2001 pp. 1-12, XP002551706 *the whole document*.
Butrico M et al: "Enterprise data access from mobile computers: an end-to-end story" Research Issues in Data Engineering, 2000. Ride 2000. Proceedings. Tenth International Workshop on San Diego, CA, USA Feb. 28-29, 2000, Los Alamitos, CA, USA, IEEE Comput. Soc, US, pp. 9-16, XP010377083.
Chadwick, D.W. et al: "Modifying LDAP to Support X.509-based PKIs", In Seventeenth Annual IFIP WG 11.3 Working Conference on Database and Applications Security at Estes Park, Colorado, Aug. 2003.
Deroest J.: "Ubiquitous Mobile Computing" Sunexpert Magazine, 'Online! Jul. 1998, pp. 54-56, SP002213003 Retrieved from the Internet: <URL:http://swexpert.com/C8/SE.C8.JUL.98.pdf> 'retrieved on Sep. 10, 2002'.
Hämetvaara, Vesa, "Certificate Management in Mobile Devices", May 2002.

(56) References Cited

OTHER PUBLICATIONS

Housley, R. et al., "Internet X.509 Public Key Infrastructure Certificate and CRL Profile (RFC 2459)", Jan. 1999.
Itu-T, "Information Technology—Open Systems Interconnection—The Directory: Public-key and Attribute Certificate Frameworks", Mar. 2000.
Jin Jing et al: "Client-server computing in mobile environments" ACM Computing Surveys, Jun. 1999, ACM, USA, vol. 31, No. 2, pp. 117-157, XP002212945.
Myers, M. et al., "Certificate Management Messages over CMS (RFC 2797)", Apr. 2000.
Myers, M. et al., X.509 Internet Public Key Infrastructure Online Certificate Status Protocol—OCSP, RFC2560 (Jun. 1999).
Nakajima et al: "Adaptive continuous media applications in mobile computing environments" Multimedia Computing Systems '97. Proceedings, IEEE International Conference on Ottawa, Ont., Canada Jun. 3-6, 1997, Los Alamitos, CA, USA, IEEE Comput. Soc. US, Jun. 3, 1997, pp. 152-160, XP010239184.
Ramsdell, D. et al., "Secure/Multipurpose Internet Mail Extensions (S/MIME) Version 3.1 Certificate Handling (RFC 3850)", Jul. 2004.
Research in Motion Limited, "BlackBerry Security with the S/MIME Support Package", Version 1.5, Dec. 17, 2003.
Russell S: "Fast Checking of individual certificate revocation on small systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US, Dec. 6, 1999, pp. 249-255, XP010368617.
Wasley D.L. et al: "Improving Digital Credential Management in Browsers" Internet Article. HEPKI-TAG Recommendation, 'Online! Jul. 21, 2000, XP002213004 Retrieved from the Internet: <URL:http://middleware.internet2.edu/hepk i-tag/HEPKI-TAG-Certs-Browser-03.pdf> retrieved on Sep. 10, 2002.
Zollner J.: "Gateway to Overcome Incompatibilities of Security Mechanisms" Reliable Distributed Systems, 1999. Proceedings of the 19th IEEE Symposium on Lausanne, Switzerland Oct. 19-22, 1999, Los Alamitos, Cal, USA, IEEE Comput. Soc, US Oct. 19, 1999, pp. 372-377, XP010357040 ISBN: 978-0-7695-0290-8 *the whole document*.
Chinese Office Action. Application No. 200580039452.X. Dated: May 4, 2010.
Notice of Allowance. Co-pending U.S. Appl. No. 11/089,869. Dated: Mar. 17, 2010.
Request for Continued Examination (RCE). Co-pending U.S. Appl. No. 11/089,869. Dated: May 21, 2010.
Notice of Allowance. Co-pending U.S. Appl. No. 11/089,869. Dated: Jun. 28, 2010.
Canadian Office Action dated Oct. 7, 2010, Canadian Patent Application No. 2,585,987.
Co-pending U.S. Appl. No. 12/916,929, "System and Method for Processing Encoded Messages for Exchange with a Mobile Data Communication Device", filed Nov. 1, 2010.
Notification of Completion and Notification of Grant. Chinese Patent Application No. 200580039452.X. Dated: May 19, 2011.

* cited by examiner

SYSTEM AND METHOD FOR PROTECTING MASTER ENCRYPTION KEYS

REFERENCE TO RELATED APPLICATION

This application claims the benefit of U.S. Provisional Application No. 60/726,271, filed Oct. 14, 2005, the contents of which are herein incorporated by reference.

FIELD OF THE INVENTION

Embodiments of the systems and methods described herein relate generally to data security on computing devices (e.g. mobile devices), and more specifically to the protection of encryption keys used to encrypt and decrypt data transmitted between computing devices.

BACKGROUND OF THE INVENTION

Some mobile devices offer content protection capabilities. Content protection provides for the encryption of data that is stored on a mobile device, so that an attacker cannot access the data. This functionality may be particularly useful for securing potentially sensitive or personal data, including electronic mail ("e-mail") messages and addresses, calendar data, accessed web content and browser histories, and note or task data, for example. If content protection is enabled, then such data, when stored on a mobile device, will be encrypted with a content protection key. Furthermore, when a mobile device receives such data from a data server (e.g. a message management server), that data may be automatically encrypted upon receipt at the mobile device if content protection is enabled, also with a content protection key. Encryption of the data received at the mobile device may be performed whether or not the mobile device is locked.

Data communicated between a data server and a mobile device is also typically encrypted to protect the confidentiality of that data during transport. A master transport encryption key may be used to secure the data communications between the data server and the mobile device. Where a symmetric encryption algorithm is used to secure these data communications for example, a copy of the master transport encryption key will typically be stored on the mobile device. The master transport encryption key stored on the mobile device is used to facilitate, for example, the decryption of data received at the mobile device from the data server. Potentially, at the mobile device, the decrypted data may then be re-encrypted with a content protection key if content protection is enabled, as generally described in the preceding paragraph.

The master transport encryption key, itself, may not be protected when stored (e.g. in flash memory) on the mobile device. Therefore, an attacker who obtains access to the mobile device might retrieve the master transport encryption key from storage, and use it to decrypt data communications between the data server and the mobile device. Accordingly, the security of sensitive data may be breached, despite the protection afforded to the data when it is stored on the mobile device through content protection.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Figure 1:
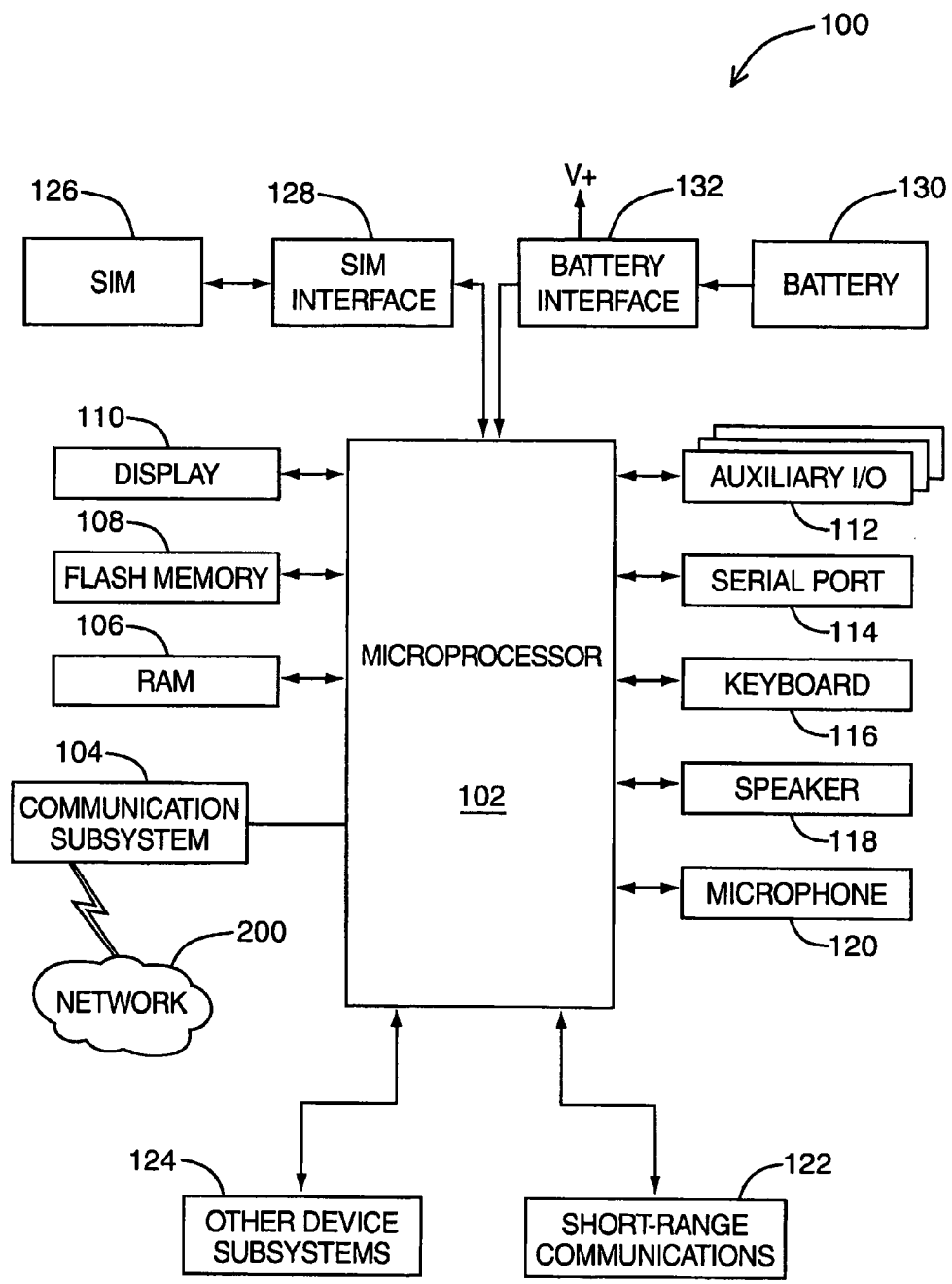
FIG. 1 is a block diagram of a mobile device in one example implementation.

In systems where content protection functionality may be enabled on a computing device (e.g. a mobile device) to secure potentially sensitive or personal user data, the master transport encryption keys stored on the computing device that are used to encrypt data being sent to a data server (e.g. a message management server) and to decrypt data received from the data server are, in contrast, not typically secured. Therefore, user data such as e-mail messages and addresses, calendar data, accessed web content and browser histories, and note or task data, for example, that would otherwise be secured if stored on the computing device when content protection is enabled, may nevertheless be accessed by an attacker who obtains possession of a master transport encryption key and who intercepts such data while the data is in transit between the computing device and the data server.

For that reason, it may be desirable to secure master transport encryption keys that are stored on the computing device, in order to prevent an attacker from retrieving them from a store on the computing device and using them to access data without authorization while the data is in transit between the computing device and a data server.

In accordance with at least one of the embodiments described herein, one or more master transport encryption keys may be stored on the computing device (e.g. in a flash memory of a mobile device) in encrypted form, having been encrypted using a content protection key. As data can be encrypted in accordance with a content protection framework using a content protection key in order to protect that data ("content protected data") when it is stored on the computing device, encryption of master transport encryption keys using a content protection key can also be performed to protect those keys when they are stored on the computing device.

However, in systems where content protection is enabled, no content protected data stored on the computing device would typically be permitted to exist in decrypted form while the device is locked. It is usually assumed that since the computing device has not yet been unlocked for use by the user, there would be no reason why the content protected data or the content protection key that would decrypt that data should be permitted to exist in a decrypted form on the computing device.

On the other hand, if the master transport encryption keys, having been encrypted with a content protection key, are not permitted to exist in decrypted form while the computing device is locked, then this may be an undesirable restriction in certain applications. For example, where the computing device is a mobile device, it is generally desirable for certain master transport encryption keys to be accessible even while the mobile device is locked, so that data can still be received at the mobile device (e.g. from a data server) while the mobile device is in the locked state. Otherwise, the mobile device would not be able to receive any data until the user unlocks the device for his or her use, and the resultant download upon the unlocking of the device may potentially be lengthy and cause inconvenience to the user.

Accordingly, at least one embodiment described herein is directed to a system and method that not only provides additional security to data by protecting master transport encryption keys stored on a computing device (e.g. a mobile device), but also permits access to at least one master transport encryption key while the computing device is in a state where data is to be received (e.g. from a data server) by the computing device.

In one broad aspect, there is provided a method of protecting master transport encryption keys stored on a first computing device, wherein at least one master transport encryption key is used to secure data communications between the first computing device and a second computing device, the method comprising the steps of: generating a copy of the at least one master transport encryption key; encrypting the at least one master transport encryption key; storing the encrypted at least one master transport encryption key in a non-volatile store; and storing the copy of the at least one master transport encryption key in a volatile store, such that the copy of the at least one master transport encryption key stored in the volatile store is usable to facilitate decryption of data received at the first computing device from the second computing device while the first computing device is locked.

In another broad aspect, there is provided a method of protecting master transport encryption keys stored on a first computing device, wherein at least one master transport encryption key is used to secure data communications between the first computing device and a second computing device, the method comprising the steps of: generating a temporary encryption key; encrypting the at least one master transport encryption key with the temporary encryption key; storing the encrypted at least one master transport encryption key in a non-volatile store; and storing the temporary encryption key in a volatile store, such that the temporary encryption key is usable to decrypt the at least one master transport encryption key, and wherein the at least one master transport encryption key is usable to facilitate decryption of data received at the first computing device from the second computing device while the first computing device is locked.

These and other aspects and features of various embodiments will be described in greater detail below.

Some embodiments of the systems and methods described herein may be implemented on a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
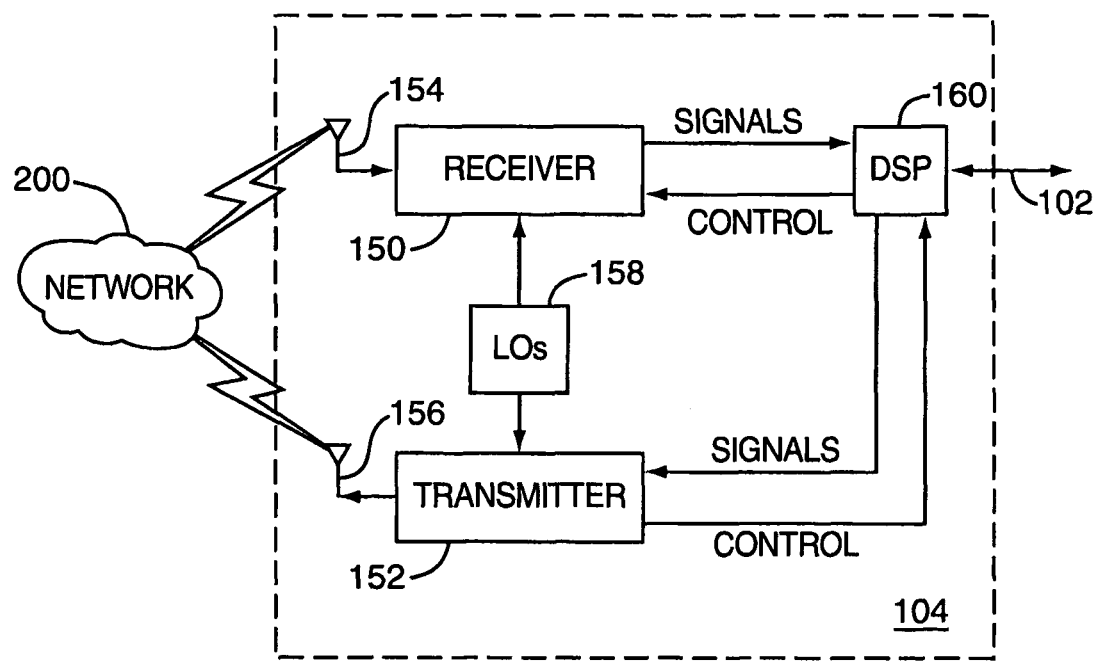
FIG. 2 is a block diagram of a communication subsystem component of the mobile device of FIG. 1.
Figure 3:
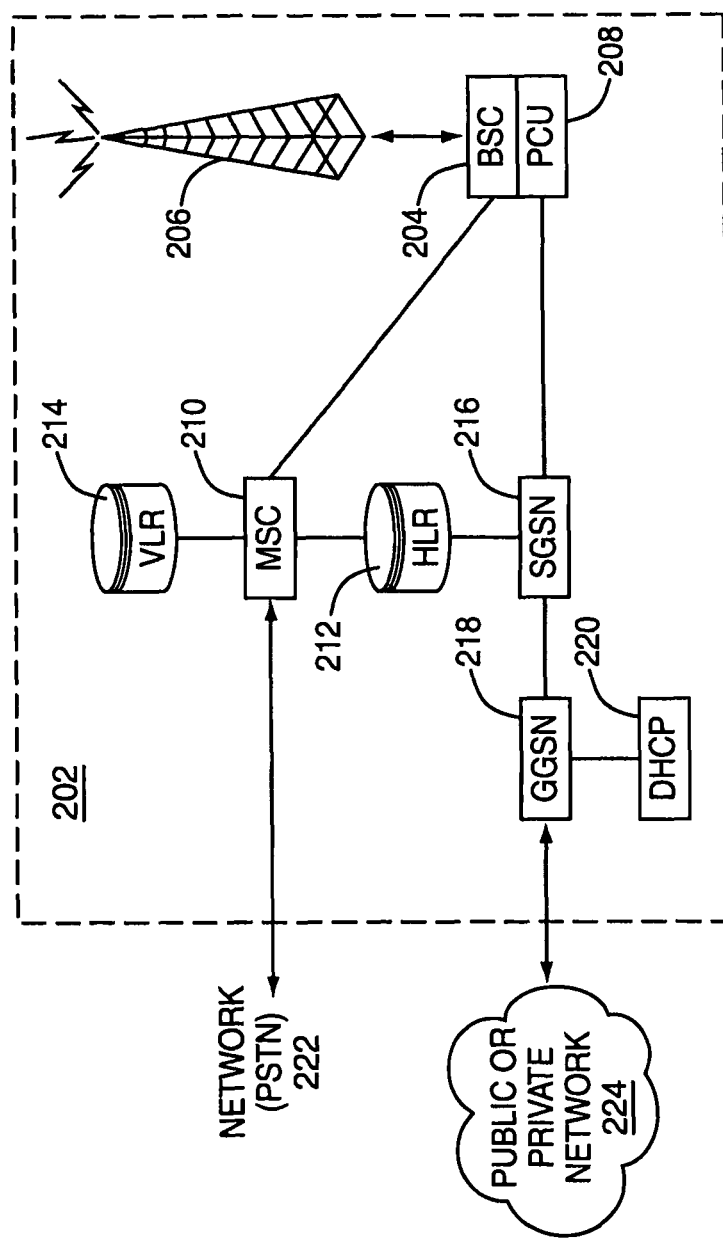
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. These data items can be considered to constitute user data that may be considered to be sensitive or personal in nature. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
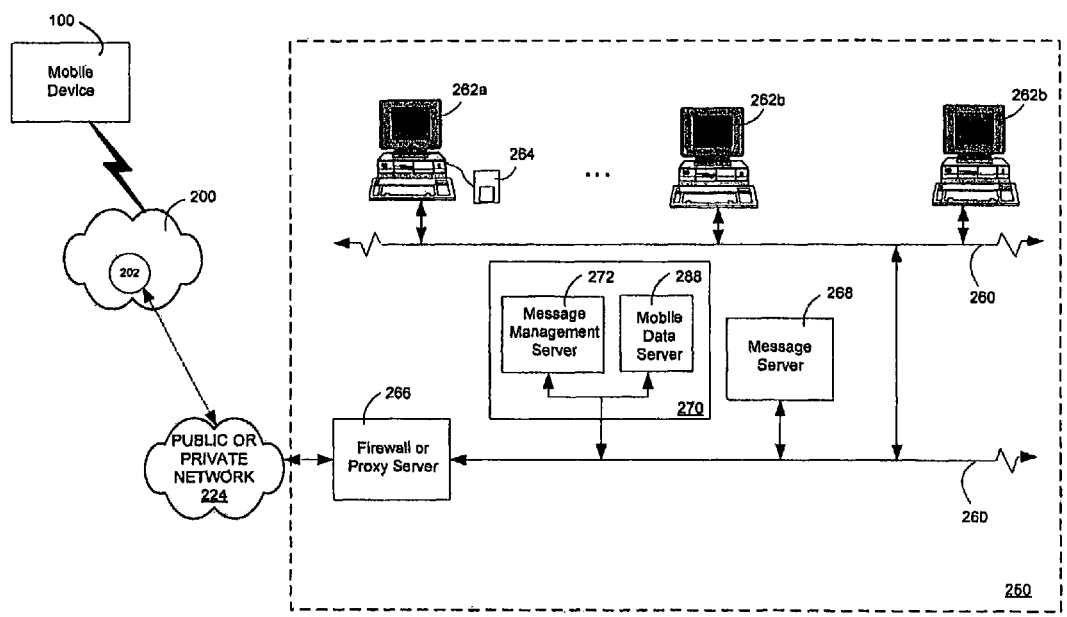
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages and message-related data, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES), Triple DES, or Advanced Encryption Standard (AES)) and push them to mobile device 100 via the shared network infrastructure 224 and wireless network 200; and receive messages composed on mobile device 100 (e.g. encrypted using Triple DES or AES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Wireless communications support components 270 may also comprise a mobile data server 288. Mobile data server 288 may be adapted to allow mobile device 100 to directly query public key infrastructure (PKI) servers in LAN 250 or network 224 to perform functions that facilitate secure message transmission between users, for example.

Wireless communications support components 270, such as message management server 272 for example, may be adapted to transmit different types of data to mobile device 100 and receive different types of data from mobile device 100 other than e-mail messages. For example, meeting requests and other types of data may be transmitted between message management server 272 and mobile device 100. In the specification and in the claims, the term "data server" may be used generally to describe a computing device that transmits data to and/or receives data from another computing device, such as mobile device 100 for example. One example of a data server is message management server 272. Other computing devices (e.g. mobile data server 288) may also be identified as a data server in variant system embodiments.

As described with reference to message management server 272 in the example of FIG. 4, the confidentiality of data sent between two computing devices, such as data sent between a data server (e.g. message management server 272) and a computing device (e.g. mobile device 100) for example, may be protected by encrypting the data prior to transit.

For example, symmetric key cryptography may be employed. Data that is sent between the data server and the computing device may be encrypted using an AES or Triple DES algorithm, for example.

A master transport encryption key is used to secure such data communications between two computing devices, such as the data server and a mobile device. In one example implementation, the master transport encryption key is specific to the mobile device. A copy of the master transport encryption key will typically be stored on the mobile device. A copy of the master transport encryption key will also be available to the data server for use.

In particular, the master transport encryption key stored on the mobile device is used to facilitate the encryption and decryption of data that the mobile device transmits to and/or receives from the data server. Multiple transport encryption keys may also be stored on the mobile device, each used for communication with a different data server, for example. Similarly, the master transport encryption key accessible to the data server is used to facilitate the encryption and decryption of data that the data server transmits to and/or receives from the mobile device.

A master transport encryption key may be used to facilitate the encryption and decryption of data transmitted between computing devices in a number of ways. In one system embodiment, the master transport encryption key may be used directly to encrypt and decrypt the data to be transmitted.

In another system embodiment, the master transport encryption key may be used indirectly to encrypt and decrypt the data to be transmitted in order to secure the data, through the use of message keys. The message key itself may comprise a small amount of random information, intended to be difficult for an attacker to decrypt, recreate, or duplicate. The data server, for example, can generate a message key for each "message" (e.g. a block of data) that is to be sent to the mobile device. The message key is used to encrypt a message. The message key is encrypted using the master transport encryption key, and the encrypted message key is sent along with the message-key-encrypted message. When the mobile device receives the encrypted message, the accompanying encrypted message key is decrypted using the master transport encryption key available at the mobile device, and the resultant decrypted message key can then be used to decrypt the encrypted message. A message key can be generated and employed in a similar manner when a message is to be sent to the data server from the mobile device.

In variant system embodiments, techniques other than symmetric key cryptography may be used to secure data communications between computing devices, such as a data server and a mobile device. For example, the master transport encryption key stored on a computing device, such as the mobile device, may be a private key of a public key/private key pair.

Figure 5:
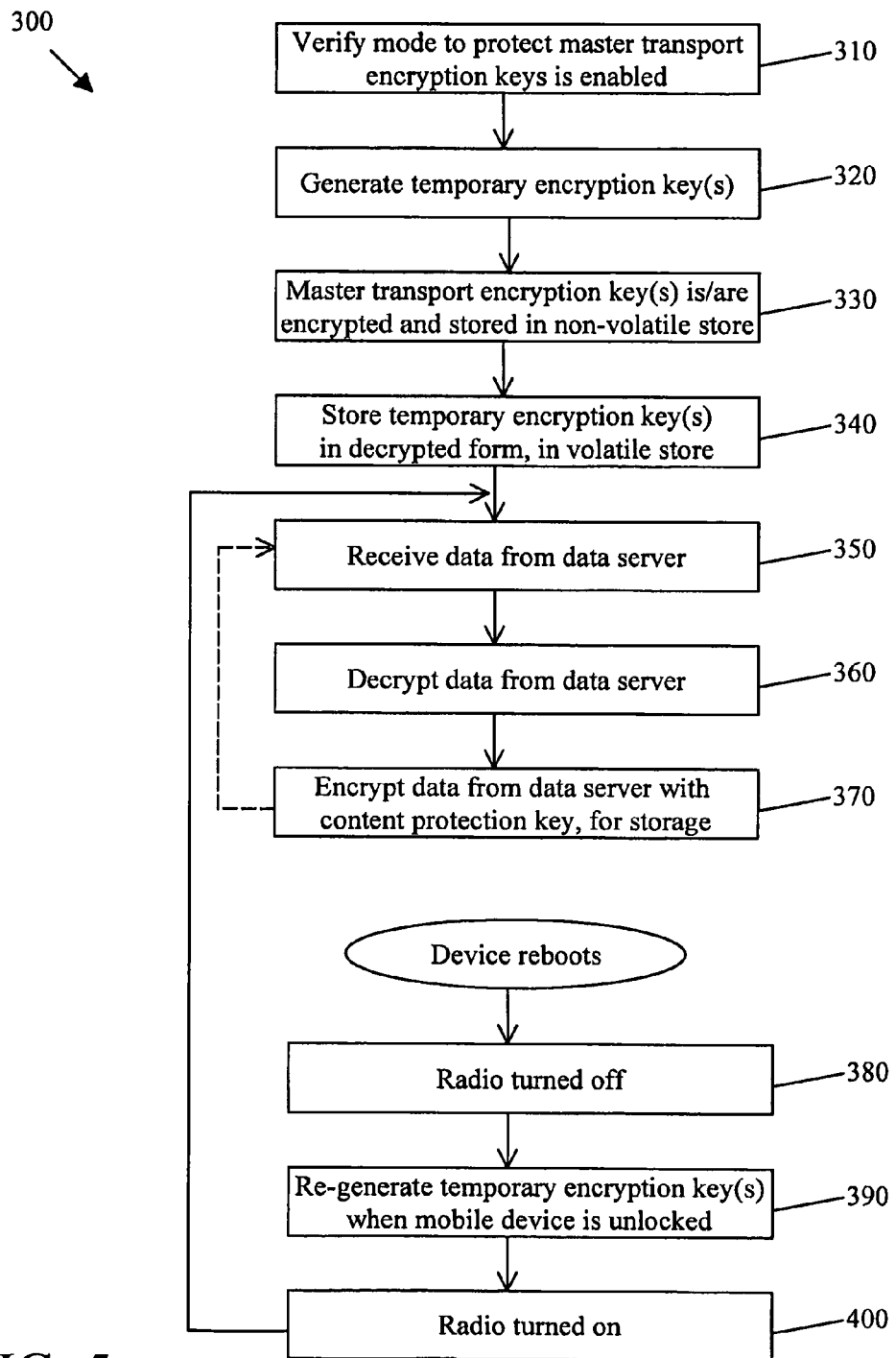
FIG. 5 is a flowchart illustrating steps in a method of protecting master transport encryption keys stored on a computing device in at least one embodiment.

Referring now to FIG. 5, a flowchart illustrating steps in a method of protecting master transport encryption keys stored on a computing device in at least one embodiment is shown generally as 300.

By way of example, embodiments will now be described in the context of a system that comprises a mobile device (e.g. mobile device 100 of FIGS. 1 and 4) coupled to a data server (e.g. message management server 272 of FIG. 4), and in which data may be transmitted between the mobile device and data server in a secure form using, whether directly or indirectly, at least one message transport encryption key.

However, it will be understood by persons skilled in the art that at least some of the embodiments will apply to systems where data is transmitted to and/or received from a first computing device other than a mobile device, and/or where data is transmitted to and/or received from a second computing device other than a data server, which is not limited to a message management server.

At step 310, the mobile device verifies that a mode to protect master transport encryption keys is enabled.

At step 320, one or more temporary encryption keys are generated. The temporary encryption key(s) will ultimately be stored in a volatile store, so that the key(s) may be used to decrypt data received by the mobile device from the data server, even while the mobile device is locked. This key is "temporary" in the sense that it will be not persist once power to the mobile device is lost. This step of storing the temporary encryption key in a volatile store will be discussed in further detail with reference to step 340 below.

In one embodiment, each temporary encryption key is generated as a copy of a corresponding master transport encryption key in its decrypted form, such that it can then be used (e.g. either directly or indirectly through the use of message keys) to decrypt data received from a data server.

In order to provide greater security for data stored on the mobile device, master transport encryption keys are to be encrypted for storage on the mobile device. However, in one embodiment, master transport encryption keys will only be stored in an encrypted form if the mode to protect master transport encryption keys has been enabled (as verified at step 310). The mobile device may be configured so that this mode is always enabled.

Alternatively, the mobile device may be configured so that the mode may be changed manually by the user or by an administrator. Master transport encryption keys may be encrypted when the mode to protect master transport encryption keys is enabled by the user or administrator, and then stored in a non-volatile store (e.g. flash memory 108 of FIG. 1) typically on the mobile device, as shown in step 330.

Encrypted master transport encryption keys may instead be pre-stored in the non-volatile store of the mobile device, prior to use of the mobile device by a user.

Notwithstanding the above example configurations, the mode to protect master transport encryption keys may be enabled by an administrator, through IT policy for example. An item in a policy file downloaded to the device may dictate that the mode is to be enabled. When the mobile device receives this policy item, the master transport encryption key will be encrypted and stored in a non-volatile store (e.g. flash memory 108 of FIG. 1) typically on the mobile device, at step 330.

In one embodiment, master transport encryption keys are encrypted at step 330 using a content protection key.

Content protection provides for the encryption of data that is stored on a mobile device [steps not shown], so that an attacker cannot access the data. This functionality may be particularly useful for securing potentially sensitive or personal data, including for example, e-mail messages and addresses, calendar data, accessed web content and browser histories, and note or task data. If content protection is enabled, then such data, when stored on a mobile device, will be encrypted with a content protection key. Furthermore, when a mobile device receives such data from a data server (e.g. message management server 272 of FIG. 4), that data may be automatically encrypted upon receipt at the mobile device if content protection is enabled [steps not shown], also with a content protection key. Encryption of the data received at the mobile device may be performed whether or not the mobile device is locked.

With respect to enabling content protection, in one example system, a symmetric key (e.g. an AES key) and an asymmetric key pair (e.g. an Elliptic curve cryptography key pair (ECC)) are generated as content protection keys when content protection is initially enabled. The symmetric key and the private key of the asymmetric key pair are each encrypted with an ephemeral key that is derived from a device password for the mobile device, for storage in a non-volatile store (e.g. flash memory) on the mobile device. In this example system, the public key of the asymmetric key pair is used to encrypt data received at the mobile device for storage on the mobile device while the device is locked (i.e. while the device is in a state where the user must provide the device password before the device can be used), and the symmetric key is used to encrypt data while the device is unlocked. The decrypted forms of the symmetric key and the private key asymmetric key pair are never stored in the non-volatile store; they are stored in a volatile store only (e.g. RAM) and are erased therefrom when the mobile device locks. When the mobile device is unlocked, the stored content protection keys are decrypted (e.g. for storage in RAM) and used to decrypt content protected data. The symmetric key, the private key of the asymmetric key pair, and the public key of the asymmetric key pair described above, are also referred to herein as a symmetric content protection key, an asymmetric private content protection key, and an asymmetric public content protection key respectively.

In this embodiment, the content protection framework has been extended to protect master transport encryption keys, in order to provide additional security for data stored on the mobile device. While the same content protection keys are used to protect the data [steps not shown] as well as the master transport encryption keys in this embodiment (at step 330), different content protection keys may be employed to secure different items being protected by the content protection framework in variant embodiments.

The mobile device may be configured such that whenever content protection is enabled, the mode to protect master transport encryption keys is deemed to be enabled. In other words, the verification performed at step 310 may require only verifying whether content protection is enabled. However, a separate mode to protect master transport encryption keys, which can be enabled and disabled independent of whether content protection is enabled or disabled, may be provided in variant embodiments.

At step 340, the one or more temporary encryption keys generated at step 320, which in an embodiment described above are copies of the one or more master transport encryption keys in decrypted form, are stored in a volatile store (e.g. RAM 106 of FIG. 1) typically on the mobile device.

In a system where content protection is enabled on the mobile device, it may be desirable to have the master transport encryption keys accessible so that incoming messages from the data server may still be decrypted even while the mobile device is locked. Accordingly, a decrypted version of the required master transport encryption key would need to be kept available for this purpose. To provide greater security, this decrypted version of the master transport encryption key is stored in a volatile store (e.g. RAM) only, and is never written to a non-volatile store, in this embodiment. It is more difficult for an attacker to steal the contents of a volatile store, and therefore, the decrypted master transport encryption key may be considered to be more secure in this location, than if it was simply stored in a non-volatile store in decrypted form. The encrypted master transport encryption keys stored in the non-volatile store at step 330 remain secure.

At step 350, data is received at the mobile device from the data server. The mobile device may or may not be in a locked state.

At step 360, the data received at step 350 from the data server is decrypted using a temporary encryption key that was stored in the volatile store at step 340. In this embodiment, the temporary encryption key is a copy of the master transport encryption key that can be used to decrypt data being received from the data server (e.g. either by directly decrypting the data, or indirectly by decrypting a message key which in turn is used to decrypt the data). This step can be performed even if the mobile device is in a locked state and content protection is enabled.

In this embodiment, within the system where content protection is enabled, after data has been decrypted using the decrypted copy of the master transport encryption key at step 360, it is then immediately encrypted with a content protection key, as shown at step 370.

For example, the asymmetric public content protection key may be used to encrypt the data received at step 350 and decrypted at step 360 for storage, while the mobile device is locked. In that case, any data that is received from the data server is immediately encrypted for storage upon receipt and is not be available for use in a decrypted form until the mobile device has been unlocked by the user. The symmetric content protection key and the asymmetric private content protection key remains encrypted and not available for use to decrypt the stored data, so long as the mobile device is locked and content protection is enabled.

On the other hand, when the mobile device is in an unlocked state, the symmetric content protection key and asymmetric private content protection key are made available in decrypted form, and can be used to encrypt data as it is received from the data server. Typically, the symmetric content protection key is used to encrypt data sent or received by the mobile device while the mobile device is unlocked. The symmetric content protection key and asymmetric private content protection key are also used to decrypt encrypted data that is stored on the mobile device as may be needed while the mobile device is in an unlocked state.

In some situations, only a subset of the data received from the data server at step 350 and decrypted at step 360 may be encrypted for storage at step 370.

Steps 350 to 370 may be repeated as further data is received from the data server during ongoing operation of the mobile device. Should the mobile device lose its power and be restarted or rebooted, the temporary encryption keys stored in the volatile store at step 340 will not persist. The only available versions of the master transport encryption keys are the encrypted versions that were stored in the non-volatile store at step 330. In a system where content protection is enabled, these keys cannot be decrypted for use until the user unlocks the mobile device with the correct device password. Moreover, until the user unlocks the device, any incoming data that the mobile device receives from the data server cannot be properly decrypted.

To avoid this problem, in one embodiment, the radio of the mobile device is turned off such that data will not be received from the data server, as shown at step 380. Once the mobile device is unlocked, the master transport encryption key(s) can be decrypted to generate copies for storage in the volatile store, as similarly described at step 340 and shown at step 390. As a result, incoming data from the data server can once again be decrypted, and the radio is turned backed on at step 400. The flow of method steps proceeds back to step 350, at which data can be received from the data server.

In a variant embodiment, where multiple master transport encryption keys are stored on the mobile device (e.g. for communication with different data servers), the master transport encryption keys may each be encrypted with a single "grand master" encryption key at step 330, instead of being encrypted with a content protection key. The temporary encryption key generated at step 320 would be a copy of this "grand master" encryption key, which would then be stored in the volatile store at step 340. When data is received from the data server at step 350 to be decrypted at step 360, the temporary encryption key in the volatile store (i.e. the copy of the "grand master" encryption key in this variant embodiment) can be used to decrypt the received data, by first decrypting the requisite master transport encryption keys with the temporary encryption key, and then using the resultant decrypted master transport encryption key(s) to decrypt the data. In this variant embodiment, it would only be necessary to store a copy of a single "grand master" encryption key, rather than multiple, individual master transport encryption keys, in the volatile store at step 340. The "grand master" encryption key, itself, may be encrypted with a content protection key, and stored in encrypted form in the non-volatile store. This would facilitate the re-generation of the copy of the "grand master" encryption key as the temporary encryption key for storage in the volatile store, if power to the mobile device becomes lost.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of protecting master transport encryption keys stored on a first computing device, wherein at least one master transport encryption key is used to secure confidentiality of data communications between the first computing device and a second computing device, wherein data to be stored on the first computing device is encryptable using a content protection key when a content protection mode is enabled on the first computing device, wherein the method comprises, at the first computing device:

generating a copy of a single grand master encryption key in decrypted form;

encrypting each individual encryption key of the at least one master transport encryption key using the grand master encryption key;

storing each individual encryption key encrypted using the grand master encryption key in a non-volatile store;

storing the copy of the single grand master encryption key in decrypted form in a volatile store; and when the first computing device is locked using the device password to prevent unauthorized use thereof while the content protection mode is enabled, retaining the copy of the single grand master encryption key in decrypted form in the volatile store for use in decrypting at least one of the individual encryption keys, encrypted using the grand master encryption key, to decrypt data received at the first computing device from the second computing device while the first computing device is locked.

2. The method of claim 1, further comprising: receiving data from the second computing device, decrypting the data received from the second computing device using the decrypted at least one of the individual encryption keys, and storing at least a subset of the decrypted data in the non-volatile store.

3. The method of claim 2, further comprising encrypting at least a subset of the stored data using the content protection key.

4. The method of claim 2, further comprising encrypting the grand master encryption key with the content protection key, storing the encrypted grand master key in the non-volatile store, and encrypting at least a subset of the stored data using a different content protection key than the content protection key used to encrypt the grand master encryption key.

5. The method of claim 1, further comprising verifying that a mode to protect master transport encryption keys is enabled, and wherein the encrypting each individual encryption key of the at least one master transport encryption key and the storing each individual encryption key encrypted using the grand master encryption key in a non-volatile store are performed after verifying that the mode to protect master transport encryption keys is enabled.

6. The method of claim 5, wherein the mode to protect master transport encryption keys is enabled when an item in a policy file that dictates the mode to protect master transport encryption keys is to be enabled is downloaded to the first computing device.

7. The method of claim 1, wherein the generating a copy of the single grand master encryption key in decrypted form and the storing the copy of the single grand master encryption key in decrypted form in a volatile store are repeated after the first computing device is restarted.

8. The method of claim 1, wherein the generating a copy of the single grand master encryption key in decrypted form and the storing the copy of the single grand master encryption key in decrypted form in a volatile store are repeated after the first computing is restarted and the first computing device is unlocked, wherein data communications between the first and second computing devices are prevented after the first computing device is restarted until the first computing device is unlocked.

9. The method of claim 1, wherein the content protection key is encryptable with an ephemeral key that is derived from a device password.

10. The method of claim 1, wherein each of the at least one master transport encryption key is used to decrypt data received from a different data server.

11. The method of claim 1, wherein the at least one master transport encryption key consists of a plurality of master transport encryption keys.

12. A non-transitory computer-readable storage medium upon which a plurality of instructions is stored, the instructions for causing a first computing device to perform the steps of a method of protecting master transport encryption keys stored on the first computing device, wherein at least one master transport encryption key is used to secure confidentiality of data communications between the first computing device and a second computing device, wherein data to be stored on the first computing device is encryptable using a content protection key when a content protection mode is enabled on the first computing device, wherein the method comprises:

generating a copy of a single grand master encryption key in decrypted form;

encrypting each individual encryption key of the at least one master transport encryption key using the grand master encryption key;

storing each individual encryption key encrypted using the grand master encryption key in a non-volatile store;

storing the copy of the single grand master encryption key in decrypted form in a volatile store; and when the first computing device is locked using the device password to prevent unauthorized use thereof while the content protection mode is enabled, retaining the copy of the single grand master encryption key in decrypted form in the volatile store for use in decrypting at least one of the individual encryption keys, encrypted using the grand master encryption key, to decrypt data received at the first computing device from the second computing device while the first computing device is locked.

13. A system for protecting master transport encryption keys stored on a first computing device, the system comprising the first computing device and a second computing device, wherein at least one master transport encryption key is used to secure confidentiality of data communications between the first computing device and the second computing device, and wherein data to be stored on the first computing device is encryptable using a content protection key when a content protection mode is enabled on the first computing device, and wherein a processor of the first computing device is configured to:

generate a copy of a single grand master encryption key in decrypted form;

encrypt each individual encryption key of the at least one master transport encryption key using the grand master encryption key;

store each individual encryption key encrypted using the grand master encryption key in a non-volatile store;

store the copy of the single grand master encryption key in decrypted form in a volatile store; and when the first computing device is locked using the device password to prevent unauthorized use thereof while the content protection mode is enabled, retain the copy of the single grand master encryption key in decrypted form in the volatile store for use in decrypting at least one of the individual encryption keys, encrypted using the grand master encryption key, to decrypt data received at the first computing device from the second computing device while the first computing device is locked.

14. The system of claim 13, wherein the first computing device comprises a mobile device.

15. The system of claim 14, wherein the non-volatile store comprises a flash memory.

16. The system of claim 14, wherein the volatile store comprises RAM.

17. The system of claim 14, wherein the second computing device comprises a data server.

18. The system of claim 17, wherein the data server comprises a message management server.

\* \* \* \* \*